US007785460B2

(12) United States Patent
Niinae

(10) Patent No.: US 7,785,460 B2
(45) **Date of Patent: *Aug. 31, 2010**

(54) METHOD FOR PRODUCING RARE EARTH METAL-BASED PERMANENT MAGNET HAVING COPPER PLATING FILM ON THE SURFACE THEREOF

(75) Inventor: Toshinobu Niinae, Osaka (JP)

(73) Assignee: Hitachi Metals, Ltd., Tokyo (JP)

( * ) Notice: Subject to any disclaimer, the term of this patent is extended or adjusted under 35 U.S.C. 154(b) by 647 days.

This patent is subject to a terminal disclaimer.

(21) Appl. No.: 11/659,849

(22) PCT Filed: Aug. 9, 2005

(86) PCT No.: PCT/JP2005/014556

§ 371 (c)(1),
(2), (4) Date: Feb. 9, 2007

(87) PCT Pub. No.: WO2006/016570

PCT Pub. Date: Feb. 16, 2006

(65) Prior Publication Data

US 2007/0269679 A1 Nov. 22, 2007

(30) Foreign Application Priority Data

Aug. 10, 2004 (JP) ............................ 2004-233302

(51) Int. Cl.
*B32B 15/18* (2006.01)
*B32B 15/20* (2006.01)
*C25D 3/58* (2006.01)

(52) U.S. Cl. ....................... 205/239; 205/291; 205/295

(58) Field of Classification Search ....................... None
See application file for complete search history.

(56) References Cited

U.S. PATENT DOCUMENTS

2003/0052013 A1* 3/2003 Ando et al. ................ 205/296
2006/0231409 A1* 10/2006 Sakamoto et al. ........... 205/292
2008/0118747 A1* 5/2008 Komatsu et al. ............ 428/336
2008/0131708 A1* 6/2008 Ninae ......................... 428/457
2009/0035603 A1* 2/2009 Niinae ........................ 428/674

FOREIGN PATENT DOCUMENTS

| | | |
|---|---|---|
| JP | 2002-105690 | 4/2002 |
| JP | 2002-146585 | 5/2002 |
| JP | 2002-327278 | 11/2002 |
| JP | 2002-332592 | 11/2002 |
| JP | 2004-137533 | 5/2004 |

OTHER PUBLICATIONS

Notification of Reason for Refusal issued on Nov. 21, 2006 to the corresponding Japanese patent application No. 2006-531642.

* cited by examiner

*Primary Examiner*—Jennifer C McNeil
*Assistant Examiner*—Jason L Savage
(74) *Attorney, Agent, or Firm*—Kratz, Quintos & Hanson, LLP

(57) ABSTRACT

[Problems] To provide a method for producing a rare earth metal-based permanent magnet having on the surface thereof a copper plating film by using a novel plating solution for use in a copper electroplating treatment capable of forming a copper plating film having excellent adhesiveness on the surface of a rare earth metal-based permanent magnet.

[Means for Resolution] The method for producing a rare earth metal-based permanent magnet having a copper plating film on the surface thereof according to the invention is characterized in that it comprises forming a copper plating film on the surface of a rare earth metal-based permanent magnet by means of a copper electroplating treatment by using a plating solution having its pH adjusted to a range from 9.0 to 11.5 and containing at least the following three components: (1) $Cu^{2+}$ ions, (2) a chelating agent having a chelate stability constant of 10.0 or higher for $Cu^{2+}$ ions, and (3) a chelating agent having a chelate stability constant of 16.0 or higher for $Fe^{3+}$ ions (where, the aforementioned chelate stability constants are confined to conditions of pH 9.0 to 11.5).

6 Claims, No Drawings

METHOD FOR PRODUCING RARE EARTH METAL-BASED PERMANENT MAGNET HAVING COPPER PLATING FILM ON THE SURFACE THEREOF

TECHNICAL FIELD

The present invention relates to a method for producing a rare earth metal-based permanent magnet having on the surface thereof a copper plating film having excellent adhesiveness by using a novel plating solution for use in a copper electroplating treatment.

BACKGROUND ART

Rare earth metal-based permanent magnets, for instance, R—Fe—B based permanent magnets represented by a Nd—Fe—B based permanent magnet, or R—Fe—N based permanent magnets represented by a Sm—Fe—N based permanent magnet, etc., utilize inexpensive materials abundant in resources and possess superior magnetic characteristics; particularly among them, the R—Fe—B based permanent magnets are employed today in various fields. However, since rare earth metal-based permanent magnets contain a highly reactive rare earth metal: R, they are apt to be oxidized and corroded in ambient, and in case they are used without applying any surface treatment, corrosion tends to proceed from the surface in the presence of small acidic or alkaline substance or water to generate rust, and this brings about the degradation and the fluctuation of magnetic characteristics. Moreover, in case such a rusty magnet is embedded in a magnetic circuit and a like device, there is fear of scattering rust as to contaminate peripheral components. In the light of such circumstances, there has been employed a method for forming a copper plating film, which is a film having superior corrosion resistance, on the surface of the rare earth metal-based permanent magnet.

In general, methods for forming copper plating films are roughly classified into a copper electroplating treatment and a copper electrolessplating treatment; however, it is important to control the plating solution in case a copper plating film is formed on the surface of the rare earth metal-based permanent magnet by means of a copper electrolessplating treatment so as to prevent problems from occurring, because rare earth metals and iron, which are the metal constituents of the magnet, elute out into the plating solution and react with the reducing agent in the plating solution, and the formation of copper plating films proceeds on the surface of the rare earth metals and iron eluted out into the plating solution. However, this is not always easy to put into practice. Furthermore, the plating solution for use in a copper electrolessplating treatment is generally expensive. Accordingly, in case of forming a copper plating film on the surface of a rare earth metal-based permanent magnet, in general, a simple and low cost copper electroplating treatment is employed.

In case of forming a copper plating film on the surface of a rare earth metal-based permanent magnet by means of a copper electroplating treatment, an alkaline plating solution is preferred to be used by taking into consideration of the strong corrosive properties under acidic conditions on the rare earth metal-based permanent magnet. Accordingly, in general, a plating solution containing copper cyanide (copper cyanide plating bath) had been used. However, although copper cyanide plating bath has high utility value considering that it provides a copper plating film having excellent properties and is an easily controllable plating solution, its environmental impact is not negligible because it contains highly toxic cyan.

Thus, recently, a plating solution containing copper pyrophosphate (copper pyrophosphate plating bath) is being used more frequently in the place of copper cyanide plating bath; however, since copper pyrophosphate plating bath contains large amount of free copper ions, in case an attempt is made to form a copper plating film directly on the surface of the rare earth metal-based permanent magnet by using copper pyrophosphate plating bath, substitution plating reaction occurs between an electrically base metal constituting the surface of the magnet, i.e., iron and the like, and copper which is an electrically noble metal, thereby causing substitution precipitation of copper on the surface of the magnet. Such factors affect the formation of a copper plating film having excellent adhesiveness, which is found problematic.

In the light of such circumstances, the present inventor has proposed in patent literature 1 a method for forming a copper plating film on the surface of a rare earth metal-based permanent magnet, which comprises carrying out a copper electroplating treatment by using a plating solution having its pH adjusted to a range from 11.0 to 13.0 and containing 0.03 mol/L to 0.5 mol/L of copper sulfate, 0.05 mol/L to 0.7 mol/L of ethylenediamine tetraacetic acid, 0.02 mol/L to 1.0 mol/L of sodium sulfate, and 0.1 mol/L to 1.0 mol/L of at least one type selected from tartarates and citrates. According to this method, a copper plating film having extremely superior adhesiveness can be formed on the surface of a rare earth metal-based permanent magnet, as compared with the case of applying a copper electroplating treatment by using copper pyrophosphate plating bath. However, even with this method, it was found still unfeasible to form a copper plating film on the surface of a rare earth metal-based permanent magnet, which assures sufficiently high adhesiveness for the corrosion resistance necessary for a rare earth metal-based permanent magnet used under severe environment.

In such a case, the adhesiveness of a copper plating film can be compensated by a method, as disclosed in patent literature 1, which comprises forming a nickel strike plating film on the surface of the rare earth metal-based permanent magnet, and then, forming a copper plating film (with regard to a method for forming a nickel strike plating film on the surface of a rare earth metal-based permanent magnet, reference can be made to, for instance, patent literature 2). This method enables forming a laminated film having extremely superior adhesiveness on the surface of a rare earth metal-based permanent magnet, however, a nickel plating film is apt to co-precipitate hydrogen during the electroplating process. Hence, in case of forming a nickel strike plating film on the surface of the rare earth metal-based permanent magnet, there is fear of causing embrittlement of the magnet due to the co-precipitated hydrogen, which leads to the degradation of magnetic characteristics of the magnet. Thus, the development of a novel method capable of forming directly a copper plating film having excellent adhesiveness on the surface of a rare earth metal-based permanent magnet by means of a copper electroplating treatment is keenly demanded.

Under such circumstances, in patent literature 3 is proposed "a surface treatment method for magnets, characterized by forming a first protective film comprising a copper film on the surface of a magnet containing rare earth metals, by electroplating with the use of a copper plating solution containing at least a copper salt compound, a phosphorus compound, an aliphatic phosphonic acid compound, and a hydroxide", as a method for forming a copper plating film having excellent adhesiveness on the surface of a rare earth metal-based permanent magnet by means of a copper electroplating treatment. However, concerning the aliphatic phosphonic acid compound, which is the constituent component of the plating solution, patent literature 3 only mentions a phosphonic acid alkali metal compound, a phosphonic acid transition metal compound, and the like, as examples; which reference can be made to paragraph number 0039 in the description thereof, but since no specific compounds are exemplified, regretfully, the actual process cannot be understood.

Patent Literature 1: JP-A-2004-137533

Patent Literature 2: JP-A-6-13218

Patent Literature 3: JP-A-2001-295091

DISCLOSURE OF THE INVENTION

Problems the Invention is to Solve

An objective of the invention is to provide a method for producing a rare earth metal-based permanent magnet having on the surface thereof a copper plating film by using a novel plating solution for use in a copper electroplating treatment capable of forming a copper plating film having excellent adhesiveness on the surface of a rare earth metal-based permanent magnet.

Means for Solving the Problems

In the light of aforementioned points, on forming a copper plating film on the surface of a rare earth metal-based permanent magnet by means of a copper electroplating treatment, the present inventor has set as the basic principle to-use a chelating agent having a high chelate stability constant for $Cu^{2+}$ ions and a plating solution adjusted to alkaline region, thereby preventing substitution precipitation of copper from occurring on the surface of the magnet due to substitution plating reaction between an electrically base metal constituting the surface of the magnet, i.e., iron and the like, and copper which is an electrically noble metal; thus, a chelating agent having a high chelate stability constant for $Cu^{2+}$ ions, such as ethylenediamine tetraacetic acid (which is denoted as “EDTA” hereinafter), 1-hydroxyethylidene-1,1-diphosphonic acid (which is denoted as “HEDP” hereinafter), aminotrimethylenephosphonic acid (which is denoted as “ATMP” hereinafter), and the like, is used. Among them, HEDP is a chelating agent long known in the art, and since in JP-A-59-136491 is disclosed a method for carrying out a copper electroplating treatment by using a plating solution containing $Cu^{2+}$ ions and HEDP (although there is not disclosed applying the plating method on a rare earth metal-based permanent magnet), it has been expected that this method is capable of forming a copper plating film having excellent adhesiveness on the surface of a rare earth metal-based permanent magnet. However, unexpectedly, on performing a cross-cut peeling test according to JIS K5400 standard to the copper plating film thus formed, it was found that the film had such a poor adhesiveness that the film easily peeled off from the surface of the magnet.

Accordingly, the present inventor searched why it is not possible to form a copper plating film having excellent adhesiveness on the surface of a rare earth metal-based permanent magnet by the method disclosed in JP-A-59-136491, and then, it has been found that, in case a rare earth metal-based permanent magnet was immersed in a plating solution adjusted to alkaline region to suppress corrosion from occurring to the magnet, surface deterioration of the magnet occurred due to the generation of a passive film made of iron hydroxide and the like originating from the metal constituents of the magnet on the surface of the magnet. As a result, it has been identified that the adhesiveness of the copper plating film with respect to the surface of the magnet decreases because the copper plating film is formed on the deteriorated surface of the magnet. Then, in order to suppress such a passive film from generating on the surface of a rare earth metal-based permanent magnet, a chelating agent having a high chelate stability constant for $Fe^{3+}$ ions was added into the plating solution, and in this manner, it has been found that a copper plating film having excellent adhesiveness can be formed on the surface of a rare earth metal-based permanent magnet.

A first embodiment of the invention is a method for producing a rare earth metal-based permanent magnet having a copper plating film on the surface thereof, which has been accomplished based on the findings above, and is characterized in that it comprises forming a copper plating film on the surface of a rare earth metal-based permanent magnet by means of a copper electroplating treatment by using a plating solution having its pH adjusted to a range from 9.0 to 11.5 and containing at least the following three components: (1) $Cu^{2+}$ ions, (2) a chelating agent having a chelate stability constant of 10.0 or higher for $Cu^{2+}$ ions, and (3) a chelating agent having a chelate stability constant of 16.0 or higher for $Fe^{3+}$ ions (where, the aforementioned chelate stability constants are confined to conditions of pH 9.0 to 11.5).

A second embodiment of the invention is the production method of the first embodiment, further characterized in that the chelating agent having a chelate stability constant of 10.0 or higher for $Cu^{2+}$ ions is at least one selected from EDTA, HEDP or a salt thereof, and ATMP or a salt thereof.

A third embodiment of the invention is the production method of the first or second embodiment, further characterized in that the chelating agent having a chelate stability constant of 16.0 or higher for $Fe^{3+}$ ions is at least one selected from pyrophosphoric acid, polyphosphoric acid, metaphosphoric acid, and salts thereof.

A fourth embodiment of the invention is the production method of the third embodiment, further characterized in that potassium pyrophosphate is used as the chelating agent having a chelate stability constant of 16.0 or higher for $Fe^{3+}$ ions.

A fifth embodiment of the invention is the production method of the first embodiment, further characterized in that the method uses a plating solution having its pH adjusted to a range from 9.0 to 11.5 and containing at least: (1) 0.03 mol/L to 0.15 mol/L of $Cu^{2+}$ ions, (2) 0.1 mol/L to 0.5 mol/L of a chelating agent having a chelate stability constant of 10.0 or higher for $Cu^{2+}$ ions, and (3) 0.01 mol/L to 0.5 mol/L of a chelating agent having a chelate stability constant of 16.0 or higher for $Fe^{3+}$ ions.

A sixth embodiment of the invention is the production method of any of the first to fifth embodiments, further characterized in that the copper electroplating treatment is carried out by using the plating solution under a plating bath temperature of 40° C. to 70° C.

A seventh embodiment is a rare earth metal-based permanent magnet having on the surface thereof a copper plating film, which is characterized in that it is produced by one of the production methods of the first to sixth embodiments.

An eighth embodiment of the invention is a plating solution for use in a copper electroplating treatment, characterized in that it has its pH adjusted to a range from 9.0 to 11.5 and containing at least: (1) 0.03 mol/L to 0.15 mol/L of $Cu^{2}$+ ions, (2) 0.1 mol/L to 0.5 mol/L of a chelating agent having a chelate stability constant of 10.0 or higher for $Cu^{2+}$ ions, and (3) 0.01 mol/L to 0.5 mol/L of a chelating agent having a chelate stability constant of 16.0 or higher for $Fe^{3+}$ ions (where, the aforementioned chelate stability constants are confined to conditions of pH 9.0 to 11.5).

Effect of the Invention

According to the invention, there can be provided a method for producing a rare earth metal-based permanent magnet having on the surface thereof a copper plating film by using a novel plating solution for use in a copper electroplating treatment capable of forming a copper plating film having excellent adhesiveness on the surface of a rare earth metal-based permanent magnet.

Best Mode for Carrying Out the Invention

The method for producing a rare earth metal-based permanent magnet having a copper plating film on the surface thereof according to the invention is characterized in that it comprises forming a copper plating film on the surface of a rare earth metal-based permanent magnet by means of a copper electroplating treatment by using a plating solution having its pH adjusted to a range from 9.0 to 11.5 and containing at least the following three components: (1) $Cu^{2+}$ ions, (2) a chelating agent having a chelate stability constant of 10.0 or higher for Cu ions, and (3) a chelating agent having a chelate stability constant of 16.0 or higher for $Fe^{3+}$ ions (where, the aforementioned chelate stability constants are confined to conditions of pH 9.0 to 11.5).

In the invention, the supply source of $Cu^{2+}$ ions constituting the plating solution for use in a copper electroplating treatment is not particularly limited, and usable are, for instance, copper sulfate, cupric chloride, copper pyrophosphate, cupric hydroxide, copper nitrate, copper carbonate, and the like.

As chelating agents having a chelate stability constant of 10.0 or higher for $Cu^{2+}$ ions under pH of 9.0 to 11.5, there can be used, in addition to the aforementioned EDTA, HEDP, and ATMP, for instance, ethylenediamine, nitrilo triacetic acid, diethylenetriamine pentaacetic acid, cyclohexanediamine tetraacetic acid, hydroxyethylethylenediamine triacetic acid, and the like. Also usable are the chelating agents in the form of salts, such as a sodium salt, a potassium salt, and so on. From the viewpoint of versatility, preferred is to use at least one selected from EDTA, HEDP or a salt thereof, and ATMP or a salt thereof. The chelate stability constant of the chelating agent for $Cu^{2+}$ ions under pH of 9.0 to 11.5 can be calculated simply by multiplying the chelate stability constant of the chelating agent known in the art by concentration fraction that is calculated by using the acid dissociation constant of the chelating agent and the pH value. For instance, the chelate stability constant of EDTA for $Cu^{2+}$ ions under pH of 9.0 to 11.5 is from 16.4 to 17.5, and the same of HEDP is from 11.3 to 11.9. All of the chelating agents exemplified herein yield chelate stability constants for $Fe^{3+}$ ions of lower than 16.0 under pH of 9.0 to 11.5.

As chelating agents having a chelate stability constant of 16.0 or higher for $Fe^{3+}$ ions under pH of 9.0 to 11.5, usable are pyrophosphoric acid, polyphosphoric acid, metaphosphoric acid, and the like. Also usable are the chelating agents in the form of salts, such as a sodium salt, a potassium salt, and so on. From the viewpoint of versatility, preferred is to use pyrophosphoric acid or a salt thereof, more specifically, potassium pyrophosphate. The chelate stability constant of the chelating agent for $Fe^{3+}$ ions under pH of 9.0 to 11.5 can be calculated simply by multiplying the chelate stability constant of the chelating agent known in the art by concentration fraction that is calculated by using the acid dissociation constant of the chelating agent and the pH value. For instance, the chelate stability constant of potassium pyrophosphate for $Fe^{3+}$ ions under pH of 9.0 to 11.5 is from 16.2 to 21.7. All of the chelating agents exemplified herein yield chelate stability constants for $Cu^{2+}$ ions of lower than 10.0 under pH of 9.0 to 11.5.

The reason why the pH of the plating solution for use in a copper electroplating treatment is set in a range from 9.0 to 11.5 is because, if the pH value should be lower than 9.0, the chelating power of the chelating agent blended in the plating solution for forming complexes with copper ions decreases as to increase free copper ions in the plating solution, and this may likely cause substitution precipitation of copper on the surface of the magnet; on the other hand, if the pH value exceeds 11.5, anodic passivation tends to occur on carrying out a copper electroplating treatment, and this may likely cause difficulties in controlling the plating bath or unfavorably influence on the film quality of the copper plating film that is formed on the surface of the magnet due to the generation of hydroxyl complexes of copper and the like in the plating solution. As the preferred combination of a chelating agent having a chelate stability constant of 10.0 or higher for $Cu^{2+}$ ions under pH of 9.0 to 11.5 and a chelating agent having a chelate stability constant of 16.0 or higher for $Fe^{3+}$ ions under pH of 9.0 to 11.5, there can be mentioned a combination of HEDP and potassium pyrophosphate. In case this combination is adopted, a copper plating film having a very dense film quality and composed of fine electrodeposited particles can be formed with excellent adhesiveness on the surface of a magnet.

As a preferable plating solution for use in a copper electroplating treatment, there can be mentioned a plating solution having its pH adjusted to a range from 9.0 to 11.5 and containing at least: (1) 0.03 mol/L to 0.15 mol/L of $Cu^{2+}$ ions, (2) 0.1 mol/L to 0.5 mol/L of a chelating agent having a chelate stability constant of 10.0 or higher for $Cu^{2+}$ ions, and (3) 0.01 mol/L to 0.5 mol/L of a chelating agent having a chelate stability constant of 16.0 or higher for $Fe^{3+}$ ions (where, the aforementioned chelate stability constants are confined to conditions of pH 9.0 to 11.5). The content of $Cu^{2+}$ ions is set in a range from 0.03 mol/L to 0.15 mol/L. This is because, if the content should be lower than 0.03 mol/L, there is fear of considerably lowering the critical current density; on the other hand, if the content exceeds 0.15 mol/L, there is fear of increasing free copper ions in the plating solution, which may cause substitution precipitation of copper on the surface of the magnet. The content of the dhelating agent having a chelate stability constant of 10.0 or higher for $Cu^{2+}$ ions is set in a range from 0.1 mol/L to 0.5 mol/L. This is because, if the content should be lower than 0.1 mol/L, it is likely that the copper ions are not sufficiently chelated in the plating solution; on the other hand, the content exceeding 0.5 mol/L only brings about an increase in cost, but no effect is expected. The content of the chelating agent having a chelate stability constant of 16.0 or higher for $Fe^{3+}$ ions is set in a range from 0.01 mol/L to 0.5 mol/L. This is because, if the content should be lower than 0.01 mol/L, there is fear of causing difficulties in suppressing surface deterioration of the magnet which is due to the generation of a passive film made of iron hydroxide and the like originating from the metal constituents of the magnet on the surface of the magnet, or of making it impossible to achieve a sufficiently high current efficiency; on the other hand, if the content exceeds 0.5 mol/L, it is likely that vigorous elution of the metal constituents of the magnet, such as iron and the like, occurs from the surface of the magnet, thereby making a copper plating film unfeasible. The pH can be adjusted by using, if necessary, sodium hydroxide and the like.

Furthermore, the plating solution for use in a copper electroplating treatment may contain known components such as.

aminoalcohols, sulfites, carboxylates, sulfates, andthe like as a depolarizer for an anode, a conducting agent, and the like.

The copper electroplating treatment may be carried out, basically, in accordance with the commonly employed copper electroplating treatment conditions, but preferred is to set a plating bath temperature of the plating solution in a range from 40° C. to 70° C. If the temperature should be lower than 40° C., there is fear of considerably lowering the critical current; on the other hand, if the temperature exceeds 70° C., disproportionation reaction likely occurs between the anode and free copper, causing difficulties in controlling the plating bath. Plating may be conducted by any manner, such as rack plating, barrel plating, and the like. The cathode current density is preferably set in a range from 0.05 A/dm$^2$ to 4.0 A/dm$^2$. If the current density should be lower than 0.05 A/dm$^2$, the film formation efficiency becomes inferior, and there may be cases in which the plating deposition potential cannot be achieved, thereby resulting in no generation of films. On the other hand, if the current density exceeds 4.0 A/dm$^2$, it is likely that vigorous hydrogen generation occurs, and pits or discoloration generate on the surface of the formed copper plating film.

According to the invention, a copper plating film having excellent adhesiveness can be formed on the surface of a rare earth metal-based permanent magnet; the coating film has such a high peeling strength that no peeling off occurs, for example, on performing a cross-cut peeling test according to JIS K5400 standard. Furthermore, the copper plating film according to the invention that is formed on the surface of a rare earth metal-based permanent magnet has superior luster, and is extremely dense. Preferably, the thickness of the copper plating film formed on the surface of a rare earth metal-based permanent magnet is in a range from 0.5 μm to 30 μm. If the thickness should be less than 0.5 μm, there is fear that a sufficiently high corrosion resistance cannot be imparted to a magnet; on the other hand, if the thickness exceeds 30 μm, there is fear of making it difficult to acquire an effective volume as a magnet, or of lowering the production efficiency.

EXAMPLES

The invention is explained in further detail below by means of examples and comparative examples, but it should be understood that the invention is not limited thereto. In the examples and comparative examples below, first, magnetic bodies were prepared by blending the starting raw materials, i.e., electrolytic iron, ferroboron, and Nd as R, at the predetermined magnet composition, and after melting and casting, the resulting product was coarsely crushed and finely ground by a mechanical crushing method to obtain a fine powder having a granularity in a range from 3 μm to 10 μm. Then, the fine powder thus obtained was shaped under a magnetic field of 10 kOe, sintered under argon atmosphere at 1100° C. for 1 hour, and the resulting sinter was subjected to aging treatment at 600° C. for 2 hours to obtain a magnetic body having a composition of 15Nd-7B-78Fe (at %) . Three test pieces were cut out from this magnetic body, namely, a test piece 3 mm×20 mm×40 mm in size (which is denoted as "test piece A" hereinafter), a test piece 1 mm×1.5 mm×2 mm in size (which is denoted as "test piece B" hereinafter), and a test piece 4 mm×2.9 mm×2.9 mm in size (which is denoted as "test piece C" hereinafter), which were each subjected to surface activation by using a 0.1 mol/L of nitric acid solution and rinsing.

Example 1

Test piece A was subjected to a barrel type copper electroplating treatment by using a plating solution for use in a copper electroplating treatment having its pH adjusted to 10.0 by using sodium hydroxide and containing (1) 0.06 mol/L of copper sulfate pentahydrate, (2) 0.15 mol/L of HEDP, and (3) 0.2 mol/L of potassium pyrophosphate, and the plating bath temperature of the plating solution controlled to 60° C., while applying a cathode current density of 1.0 A/dm for 30 minutes. Thus was formed a copper plating film on the surface of test piece A. The thickness of the copper plating film formed on the surface of test piece A was 5.0 μm (an average value of n=10). The copper plating film was found to have excellent adhesiveness free from peeling off even on performing a cross-cut peeling test according to JIS K5400 standard (evaluated at n=10). Furthermore, the copper plating film exhibited superior luster, and was very dense (confirmed by surface SEM observation).

Example 2

By using the plating solution for use in a copper electroplating treatment as described in Example 1, test piece B was subjected to a barrel type copper electroplating treatment while controlling the plating bath temperature of the plating solution to 60° C., and applying a cathode current density of 0.3 A/dm$^2$ for 80 minutes. Thus was formed a copper plating film on the surface of test piece B. The thickness of the copper plating film formed on the surface of test piece B was 5.0 μm (an average value of n=10). The copper plating film exhibited superior luster, and was very dense (confirmed by surface SEM observation). The magnetic characteristics of test piece B having a copper plating film thus formed on the surface thereof were evaluated to obtain 0.98 iHc/Hk (an average value of n=10), and, even after heating at 80° C. for 20 hours, superior magnetic characteristics were maintained without degradation.

Comparative Example 1

Test pieces A and B were subjected to a barrel type copper electroplating treatment by using a plating solution for use in a copper electroplating treatment having its pH adjusted to 10.0 by using sodium hydroxide and containing (1) 0.16 mol/L of copper sulfate pentahydrate, (2) 0.07 mol/L of phosphonobutane tricarboxylic acid (a chelating agent having a chelate stability constant lower than 10.0 for $Cu^{2+}$ ions under pH of 9.0 to 11.5), and (3) 0.1 mol/L of sodium dihydrogenphosphate dihydrate, and the plating bath temperature of the plating solution controlled to 60° C., while applying a cathode current density of 1.0 A/dm$^2$for 30 minutes. However, copper hydroxide precipitates generated in the plating solution, and no copper plating film was formed on the surfaces of test pieces A and B.

Comparative Example 2

Test pieces A and B were subjected to a barrel type copper electroplating treatment by using a plating solution for use in a copper electroplating treatment having its pH adjusted to 10.0 by using sodium hydroxide and containing (1) 0.30 mol/L of copper sulfate pentahydrate, (2) 0.07 mol/L of phosphonobutane tricarboxylic acid, and (3) 0.05 mol/L of potassium pyrophosphate, and the plating bath temperature of the plating solution controlled to 60° C., while applying a cathode current density of 1.0 A/dm$^2$ for 30 minutes. However, copper hydroxide precipitates generated in the plating solution, and no copper plating film was formed on the surfaces of test pieces A and B.

Example 3

Test piece C was subjected to a barrel type copper electroplating treatment by using a plating solution for use in a copper electroplating treatment having its pH adjusted to 11.0 by using sodium hydroxide and containing (1) 0.06 mol/L of copper sulfate pentahydrate, (2) 0.15 mol/L of HEDP, and (3) 0.05 mol/L of potassium pyrophosphate, and the plating bath temperature of the plating solution controlled to 50° C., while applying a cathode current density of 0.3 A/dm$^2$ for 80 minutes. Thus was formed a copper plating film on the surface of test piece C. The thickness of the copper plating film formed on the surface of test piece C was 4.6 μm (an average value of n=10). The copper plating film exhibited superior luster, and was very dense (confirmed by surface SEM observation). Then, test piece C having the copper plating film on the surface thereof was subjected to a barrel type nickel electroplating treatment by using a known Watt nickel plating solution while controlling the plating bath temperature of the plating solution to 50° C., and applying a cathode current density of 0.2 A/dm$^2$ for 70 minutes. Thus was formed a nickel plating film on the surface of the copper plating film. The thickness of the nickel plating film formed on the surface of the copper plating film was 2.4 μm (an average value of n=10) . The resulting test piece C having on the surface thereof a laminated film comprising the nickel plating film and the copper plating film was heated at 450° C. for 10 minutes. As a result, on the laminated film, no phenomena such as blistering, cracking, peeling, and the like were observed, thereby showing excellent adhesiveness of the laminated film with respect to the surface of magnetic body C. Furthermore, the magnetic characteristics of test piece C having on the surface thereof a laminated film comprising the nickel plating film and the copper plating film were evaluated to obtain 0.95 iHc/Hk (an average value of n=10), and, even after heating at 80° C. for 20 hours, superior magnetic characteristics were maintained without degradation.

INDUSTRIAL APPLICABILITY

The invention has industrial applicability in the point that it provides a method for producing a rare earth metal-based permanent magnet having on the surface thereof a copper plating film by using a novel plating solution for use in a copper electroplating treatment capable of forming a copper plating film having excellent adhesiveness on the surface of a rare earth metal-based permanent magnet.

The invention claimed is:

1. A method for producing a rare earth metal-based permanent magnet having a copper plating film on the surface thereof, characterized in that it comprises forming a copper plating film on the surface of a rare earth metal-based permanent magnet by means of a copper electroplating treatment by using a plating solution having its pH adjusted to a range from 9.0 to 11.5 and containing at least the following three components: (1) $Cu^{2+}$ ions, (2) a chelating agent having a chelate stability constant of 10.0 or higher for $Cu^{2+}$ ions at pH of 9.0 to 11.5, and (3) a chelating agent having a chelate stability constant of 16.0 or higher for $Fe^{3+}$ ions at pH of 9.0 to 11.5.

2. The production method as claimed in claim 1, characterized in that the chelating agent having a chelate stability constant of 10.0 or higher for $Cu^{2+}$ ions at pH of 9.0 to 11.5 is at least one selected from ethylenediamine tetraacetic acid, 1-hydroxyethylidene-1,1-diphosphonic acid or a salt thereof, and aminotrimethylenephosphonic acid or a salt thereof.

3. The production method as claimed in claim 1, characterized in that the chelating agent having a chelate stability constant of 16.0 or higher for $Fe^{3+}$ ions at pH of 9.0 to 11.5 is at least one selected from pyrophosphoric acid, polyphosphoric acid, metaphosphoric acid, and salts thereof.

4. The production method as claimed in claim 3, characterized in that potassium pyrophosphate is used as the chelating agent having a chelate stability constant of 16.0 or higher for $Fe^{3+}$ ions at pH of 9.0 to 11.5.

5. The production method as claimed in claim 1, characterized in that the method uses a plating solution having its pH adjusted to a range from 9.0 to 11.5 and containing at least: (1) 0.03 mol/L to 0.15 mol/L of $Cu^{2+}$ ions, (2) 0.1 mol/L to 0.5 mol/L of a chelating agent having a chelate stability constant of 10.0 or higher for $Cu^{2+}$ ions at pH of 9.0 to 11.5, and (3) 0.01 mol/L to 0.5 mol/L of a chelating agent having a chelate stability constant of 16.0 or higher for $Fe^{3+}$ ions at pH of 9.0 to 11.5.

6. The production method as claimed in claim 1, characterized in that the copper electroplating treatment is carried out by using the plating solution under a plating bath temperature of 40° C. to 70° C.

* * * * *